(12) United States Patent
Wait

(10) Patent No.: US 7,752,250 B2
(45) Date of Patent: Jul. 6, 2010

(54) ROUNDING FLOATING POINT DIVISION RESULTS

(75) Inventor: Charles David Wait, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 1212 days.

(21) Appl. No.: 11/330,692

(22) Filed: Jan. 12, 2006

(65) Prior Publication Data

US 2007/0162535 A1    Jul. 12, 2007

(51) Int. Cl.
- G06F 7/44 (2006.01)
- G06F 7/38 (2006.01)
- G06F 7/52 (2006.01)

(52) U.S. Cl. .................. 708/504; 708/497; 708/653
(58) Field of Classification Search .......... 708/497, 708/499, 500, 504, 650
See application file for complete search history.

(56) References Cited

U.S. PATENT DOCUMENTS

| | | | |
|---|---|---|---|
| 5,235,533 A | 8/1993 | Sweedler | |
| 5,258,943 A | 11/1993 | Gamez et al. | |
| 5,404,324 A | 4/1995 | Colon-Bonet | |
| 5,511,016 A | 4/1996 | Bechade | |
| 5,515,308 A | 5/1996 | Karp et al. | |
| 5,563,818 A | 10/1996 | Agarwal et al. | |
| 5,671,171 A | 9/1997 | Yu et al. | |
| 5,696,711 A | 12/1997 | Makineni | |
| 5,764,555 A * | 6/1998 | McPherson et al. | 708/497 |
| 5,787,030 A * | 7/1998 | Prabhu et al. | 708/650 |
| 5,841,683 A | 11/1998 | Bechade et al. | |
| 5,917,741 A | 6/1999 | Ng | |
| 6,134,574 A * | 10/2000 | Oberman et al. | 708/551 |
| 6,314,442 B1 | 11/2001 | Suzuki | |
| 6,697,832 B1 | 2/2004 | Kelley et al. | |

OTHER PUBLICATIONS

Agarwal, R., Gustavson, F., Schmookler, M, Series Approximation Methods for Divide and Square Root in the Power3™ Processor, 14th IEEE Symposium on Computer Arithmetic, ARITH-14 '99, pp. 116-123, USA. http://doi.ieeecomputersociety.org/10.1109/ARITH.1999.762836.

* cited by examiner

*Primary Examiner*—Chat C Do
*Assistant Examiner*—Kevin Hughes
(74) *Attorney, Agent, or Firm*—Karuna Ojanen; Robert R. Williams

(57) ABSTRACT

A method for determining the correct result and the correct guard and sticky bits to obtain a more accurate result in floating point divide operations is presented. An intermediate divide result or quotient is obtained from a multiply-add hardware pipeline of a floating point processor. Remainders are calculated using the floating point numbers divided, the unit of least precision, and the unit of least precision plus one to determine where the infinitely precise result is with respect to the digital representation of the estimated quotient. Evaluating these remainders and the initial floating point numbers and comparing their signs and magnitudes leads to a selection of one of three choices as the most accurate representation of the infinitely precise result as calculated in the inventive rounding method: the intermediate result minus the unit of least precision; the intermediate divide result; or the intermediate divide result plus the unit of least precision. Based on a rounding mode determined by the floating point operation, the correct guard and sticky bits are also determined and, which along with the most accurate intermediate divide result, are forwarded for accurate rounding in accordance with the IEEE standard for single and double precision floating point numbers.

1 Claim, 4 Drawing Sheets

Figure 4

ROUNDING FLOATING POINT DIVISION RESULTS

FIELD OF THE INVENTION

This invention relates generally to the field of computer processing and more particularly relates to a method of rounding in a floating point processing unit to obtain a more accurate answer.

BACKGROUND OF THE INVENTION

A real number is represented by a whole number and a fractional part; the fractional part of the number is called the mantissa. The term floating point means that there is no fixed number of digits before and after the decimal point of mantissa; the decimal point can float in contrast to fixed-point numbers in which the number of digits before and after the decimal point is set. Computers represent most floating-point numbers as approximations using complex codes so calculations of floating-point numbers are generally slower and less accurate than fixed-point representations, but can represent a larger range of numbers. In fact, one of the challenges in developing computers with floating-point values is ensuring that the approximations lead to reasonable results. If the programmer is not careful, small discrepancies in the approximations can snowball to the point where the final results are absurd.

Calculating floating-point numbers requires a great deal of computing power and most microprocessors come with a chip, called a floating point unit (FPU), specialized for performing floating-point arithmetic. FPUs are also called math coprocessors and numeric coprocessors. The most popular code for representing real numbers is called the IEEE Floating-Point Standard. An IEEE-754 floating point number, also just called a "float", has three components: a sign bit telling whether the number is positive or negative, an exponent giving its order of magnitude, and a mantissa specifying the actual digits of the number; there is also an analogous 96-bit extended-precision format under IEEE-854. Using single-precision floats as an example, here is the layout of the 32 bits of a four byte word:

```
sxxxxxxxxmmmmmmmmmmmmmmmmmmmmmmm
31                              0
``` where s=sign bit, x=exponent, m=mantissa. The IEEE long real or double precision has one bit for the sign, eleven bits for the exponent, and 52 bits for the mantissa. The value of the number is the mantissa times $2^x$, where x is the exponent.

There is a potential problem with storing both a mantissa and an exponent because, recall, with a floating point number, the decimal place can float so the number 0.2 can be represented as $2 \times 10^{-1} = 0.2 \times 10^0 = 0.02 \times 10^1$, etc. In the IEEE standard, the problem is circumvented by normalizing the whole mantissa as being to the right of the decimal point, with an implied "1" always present to the left of the decimal. For example, decimal 1234.567 is normalized as $1.234567 \times 10^3$ by moving the decimal point so that only one digit appears before the decimal. A special case exists when the number is zero; then every bit is zero and the sign bit is irrelevant. Zero is not the only "special case," there are also representations for positive and negative infinity, and for a not-a-number (NaN) value for results that do not make sense such as the result of a divide-by-zero or an infinity-times-zero operation. A number is infinite if every bit of the exponent is set and is NaN if every bit of the exponent is set plus any mantissa bits are set. The sign bit still distinguishes +/−infinity and +/−NaN. The table below presents certain characteristics of both single- and double-precision IEEE floating point numbers:

| Property | Value for float | Value for double |
| --- | --- | --- |
| Largest representable number | 3.402823466e+38 | 1.7976931348623157e+308 |
| Smallest number w/ precision | 1.175494351e−38 | 2.2250738585072014e−308 |
| Smallest representable number | 1.401298464e−45 | 5e−324 |
| Mantissa bits | 23 | 52 |
| Exponent bits | 8 | 11 |
| Epsilon is the smallest x such that 1 + x > 1; It is the place value of the least significant bit when the exponent is zero. | 1.1929093e−7 | 2.220446049250313e−16 |

Floating point arithmetic uses sophisticated numerical algorithms. Because of the number of bits used to represent a floating point number, it is difficult to ascertain when two floating point numbers are equal, i.e., it is relatively rate for the numbers match bit for bit, especially when some of bits might be approximations and/or incorrect. For example, in the table above, epsilon represents how to determine if two numbers are/are not equal. The precision of a floating point number is measured in significant digits and determined by the number of correct bits. Although a 32-bit integer can represent any nine-digit decimal number, a 32-bit floating point number offers only about seven digits of precision.

Uncertain equality is only the tip of the iceberg of problems caused by limited accuracy and precision. Loss of significance refers to a class of situations wherein precision and information have been inadvertently lost with the potential of ending up with laughably bad results. To simplify things, one way to consider the problem of loss of precision is that a float gradually gets "corrupted" as more and more operations are performed. For example, a fraction such as ⅕ or 0.2 must be represented by a sum of fractions whose denominators are powers of 2. Below is the output from a program that subtracts each successive fraction from 0.2 and shows each remainder. As can be seen below, an exact value is not realized even after creating the 23 mantissa bits. The result, however, is accurate to only seven digits.

```
starting: 0.200000000000
subtracting 0.125000000000    remainder = 0.075000000000
```

-continued

| | |
|---|---|
| subtracting 0.062500000000 | remainder = 0.012500000000 |
| subtracting 0.007812500000 | remainder = 0.004687500000 |
| subtracting 0.003906250000 | remainder = 0.000781250000 |
| subtracting 0.000488281250 | remainder = 0.000292968750 |
| subtracting 0.000244140625 | remainder = 0.000048828125 |
| subtracting 0.000030517578 | remainder = 0.000018310547 |
| subtracting 0.000015258789 | remainder = 0.000003051758 |
| subtracting 0.000001907349 | remainder = 0.000001144409 |
| subtracting 0.000000953674 | remainder = 0.000000190735 |
| subtracting 0.000000119209 | remainder = 0.000000071526 |
| Mantissa: .00110011001100110011001. | |

In some computer hardware architectures, such as the POWERPC, floating point operations for arithmetic, rounding, and conversion may produce an intermediate result that may be regarded as being infinitely precise. This infinitely precise result, however, must be written into a floating point register having a finite number of bits. After normalization or denormalization, if the infinitely precise intermediate result is not representable in the precision required by the instruction then it is rounded before being placed into the target floating point register.

Hardware implementations for computer hardware floating point divide and square root instructions may use a Newton-Raphson algorithm or a power series approximation in a fused multiply-add arithmetic pipeline. A series of multiply-add instructions implement the algorithms and the result is rounded up or down in order to conform to the IEEE-754 floating point standard. Correctly rounding usually requires extra precision in the arithmetic dataflow mandating extra hardware, e.g., increased gate counts, power, and logic delay. For instance, one method that ensures that the confidence level of floating point calculations is good enough has been to make the whole hardware pipeline one bit wider and then to calculate the remainder. There is thus a need for a more efficient means to accomplish the required rounding.

SUMMARY OF THE INVENTION

This efficient means to accomplish and satisfy the IEEE-754 and IEEE-854 standards for floating point numbers is given by a method of rounding floating point numbers in a floating point processing pipeline, comprising the steps of: calculating an intermediate quotient of two floating point numbers, A and B; determining the unit of least precision of the intermediate quotient; calculating a first remainder using the two floating point numbers and the unit of least precision; calculating a second remainder using the two floating point numbers and the unit of least precision plus one; comparing the magnitudes of the first and second remainders; based on the magnitudes of the remainders, selecting a final intermediate quotient from one of the following: the intermediate quotient, the intermediate quotient minus the unit of least precision, or the intermediate quotient plus the unit of least precision; based on a rounding mode, selecting the correct guard and sticky bits of the final intermediate quotient; and forwarding the final intermediate quotient and the selected correct guard and sticky bits for correct rounding. The input guard bit is the unit of least precision of the normalized intermediate quotient, and the sticky bit is the logical OR of the bits following the unit of least precision of the normalized intermediate quotient.

Calculating and comparing the magnitudes of the first and second remainders determines if an infinitely precise result of a division or square root algorithm is closer to and less than the intermediate quotient; or if the infinitely precise result is closer to the intermediate quotient; or if the infinitely precise result is closer to the intermediate quotient plus the unit of least precision.

The method to round floating point numbers basically comprises determining whether an infinitely precise result of a divide or square root floating point algorithm is closer to an intermediate result, or the intermediate result less a unit of least precision, or the intermediate result plus a unit of least precision. It accomplishes this by considering the unit of least precision and all other bits of the intermediate result following the unit of least precision, such as a sticky OR bit that is the logical OR of the all other bits lower than the unit of least precision.

When the infinitely precise result is closer to the intermediate result less a unit of least precision, the intermediate result less the unit of least precision becomes a final quotient and a guard bit is zero and a sticky bit is one when the rounding modes are round-to-zero or round-to +/−infinity.

When the infinitely precise result is closer to the intermediate result less a unit of least precision, the intermediate result less the unit of least precision becomes a final quotient and a guard bit is one and a sticky bit is one when the rounding mode is round-to-nearest.

When the infinitely precise result is closer to the intermediate result plus a unit of least precision, the intermediate result plus the unit of least precision becomes a final quotient and a guard bit is zero and a sticky bit in any rounding mode.

When the infinitely precise result is closer to the intermediate result but less than the intermediate result, the intermediate result becomes a final quotient and a guard bit is zero and a sticky bit is one when the rounding mode is round-to-nearest.

When the infinitely precise result is closer to the intermediate result but greater than the intermediate result, the intermediate result becomes a final quotient and a guard bit is one and a sticky bit is one when the rounding mode is round-to-nearest.

The invention may further be considered a computer program product stored in a computer-readable medium to program a floating point processor to round floating point numbers, comprising instructions to implement the rounding method as described above.

BRIEF DESCRIPTION OF THE DRAWING

FIG. 4 is a chart representing the values of interest pertaining to determining the most appropriate rounding method as the multiply-add algorithm is implemented in accordance with an embodiment of the invention.

DETAILED DESCRIPTION OF THE INVENTION

Figure 1:
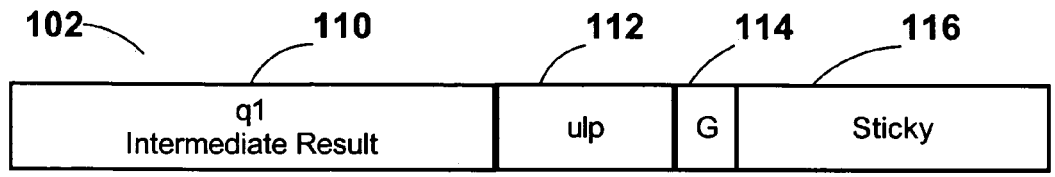
FIG. 1 is a representation of an intermediate result of a floating point operation in a processor.

With reference to FIG. 1, in order to round a floating point result 102, a computer architecture such as the POWERPC creates and works with several parameters of a floating point number 102: an intermediate result 110; a unit of least precision (ulp) 112 which is also referred to as the least significant bit; a guard bit 114; and a sticky bit 116. The guard bit 114 is really another bit of precision on the low-order side of the unit of least precision 12 of the intermediate result 110. The sticky bit 116 is the logical "OR" of all bits that may appear on the low-order side of the guard bit. The intermediate result 110 may be rounded by simply truncating after the unit of least precision (ulp) 112 or by incrementing at the unit of least precision (ulp) 112, depending on the guard bit 114, the sticky bit 116, and the rounding mode. Because of errors introduced by the precision limitations of the fused multiply-add hardware, the intermediate result 110 and guard bit 114 from the divide/square root algorithms may not be accurate enough for rounding.

Figure 2A:
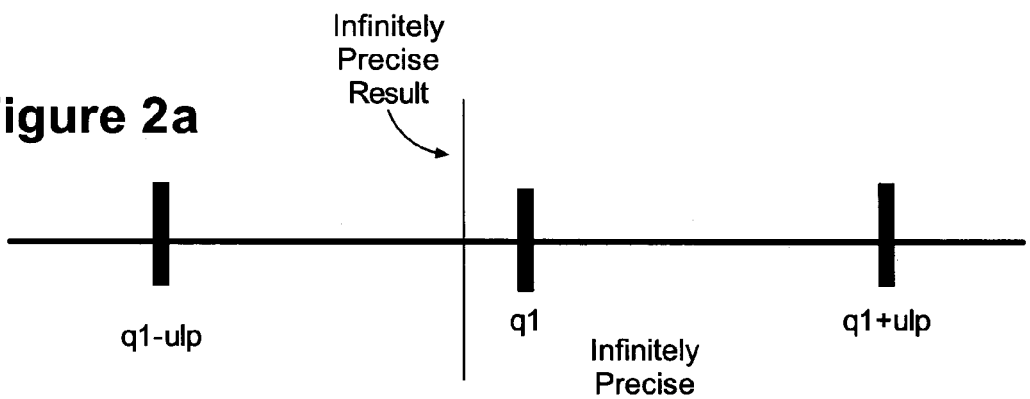
FIGS. 2a, 2b, and 2c are number lines of three possibilities of where a theoretical infinitely precise result of a floating point operation may be relative to bits representing the floating point number.
Figure 2B:
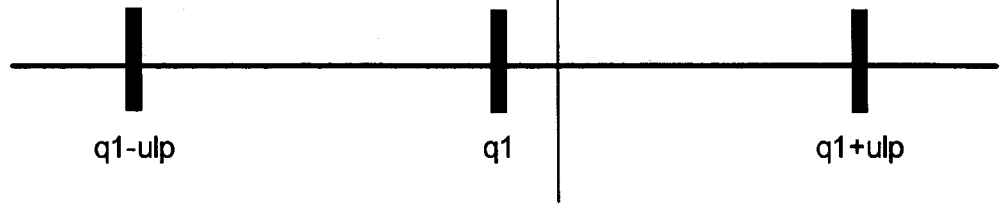
Figure 2C:
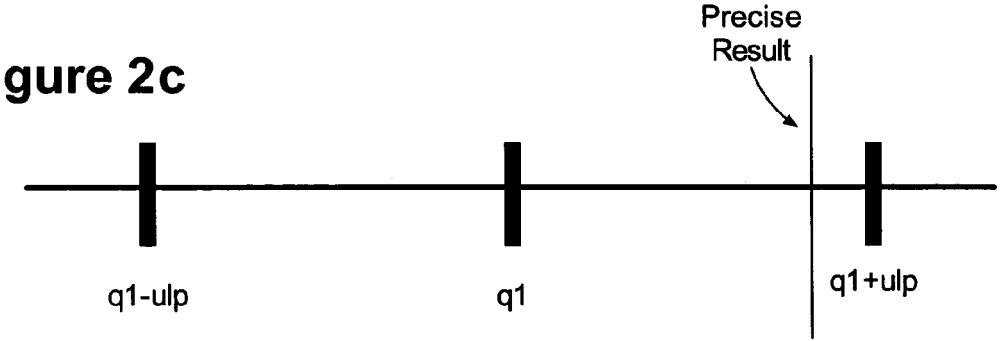

With reference to FIGS. 2a-2c, an infinitely precise result of a floating point operation may lie between the intermediate divide result q1 and q1−ulp as shown in FIG. 2a; or the infinitely precise result may lie just to the left of the intermediate divide result q1 as shown in FIG. 2b; or yet another possibility is that the infinitely precise result may lie closer to the left of q1+ulp, as shown in FIG. 2c. The inventive rounding method herein then evaluates the signs of remainders created from the floating point numbers involved and from the intermediate divide result to determine the most accurate result of the floating point operation. While an embodiment is presented herein as implemented in the hardware pipeline of a floating point divide and square root algorithm, one of skill in the art can understand that the rounding method herein can be considered a program implemented in a computer readable medium capable of reprogramming machine code of multiply-add instructions, preferably at the assembler language level, to round the results of floating point operations in accordance with the principles described herein.

Presented below is an example of a divide algorithm that might be implemented in a floating point fused multiply-add hardware pipeline. One of skill in the art will understand that the algorithm is one of many floating point algorithms that can be implemented either in software or hardware of a floating point processor; for instance, the Newton-Raphson convergence algorithm can also be used to divide floating point numbers and other algorithms are implemented for other floating point operations. The method of rounding herein is preferably implemented in floating point processor's hardware divide and square root algorithms. In order to conform to IEEE-754, different rounding modes are programmed within the computer architecture. A particular rounding mode is dependent upon the particular floating point operation. Examples of rounding modes are whether to round-to-nearest, round-to-zero, round-to +/−infinity. What this means is that given the operation, a rounding mode has been determined by the program and an intermediate result may be rounded to the nearest number. For other operations having the round-to-zero rounding mode, the next bits of an intermediate result may be rounded to zero, or may be rounded to positive or negative infinity. For example, if an intermediate result was +1.8 and needed rounding to an integer, then round-to-nearest, round-to-+infinity, round-to-infinity, round-to zero would give 2, 2, 1, 1, respectively. The +1.8 could be the intermediate result of any or many arithmetic operations. Thus, any digital arithmetic operation can have its intermediate result rounded by one of these four modes.

Figure 3:
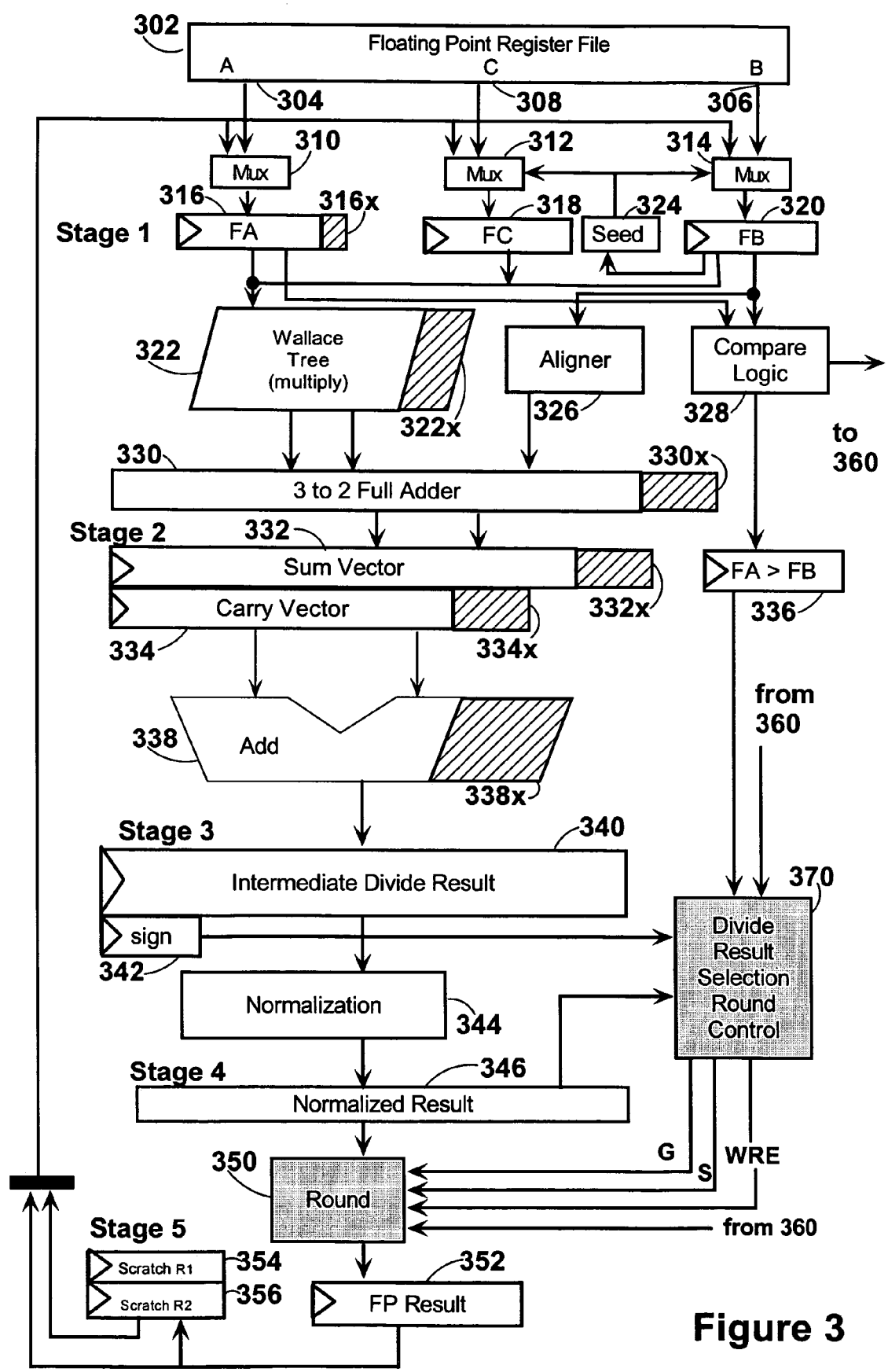
FIG. 3 is a block diagram of one representation of a hardware pipeline of a multiply-add data flow in a floating point processor in accordance with an embodiment of the invention.
Figure 4:
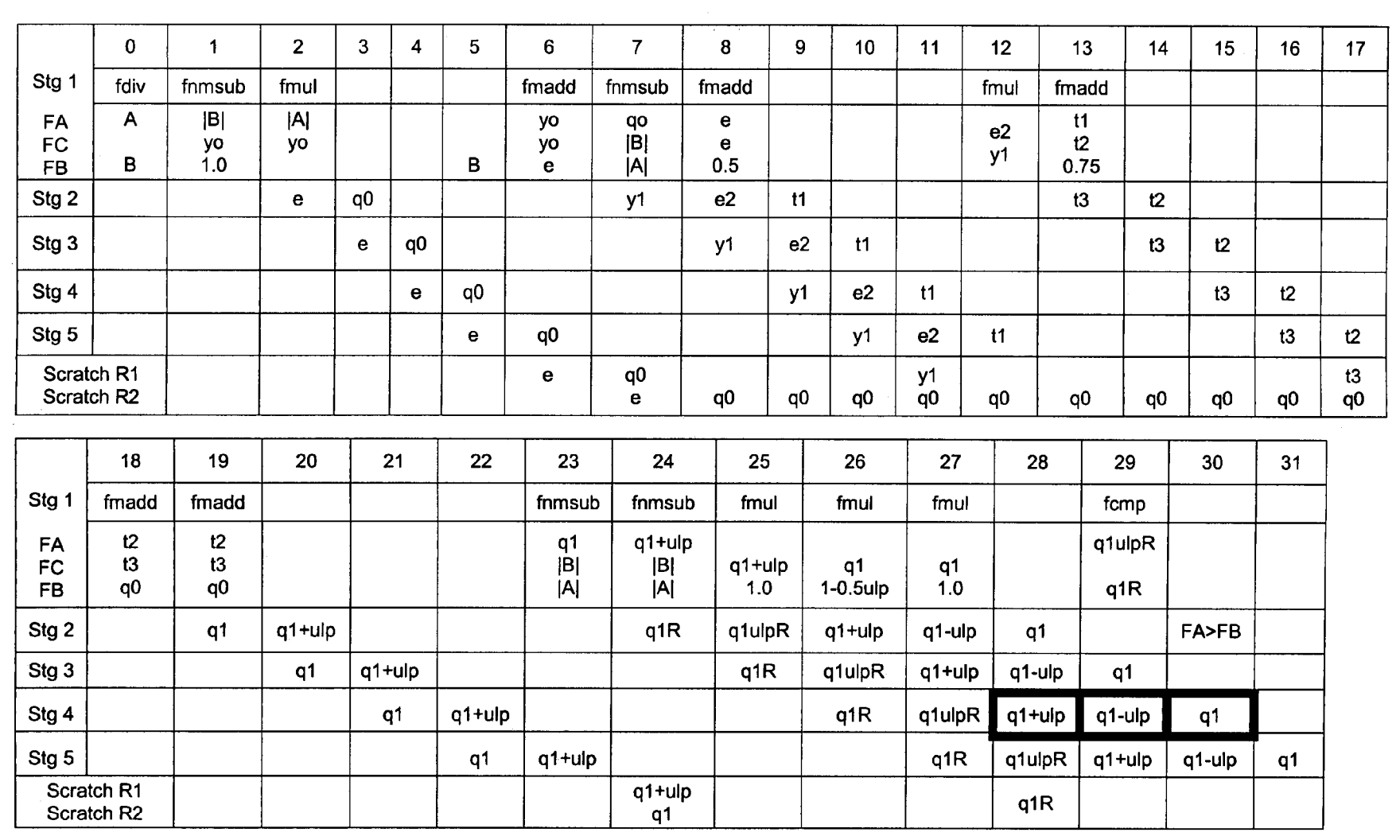

It is instructive to view the steps of the algorithm below while looking at FIG. 3 and FIG. 4. FIG. 3 is a staged hardware pipeline of a multiply-add data flow in a floating point processor. FIG. 4 is a chart of the values of the variables as the calculations proceed through the hardware pipeline of FIG. 3. The instruction unit (not shown) may issue an instruction, such as divide two floating point numbers, A and B, and given the algorithm, in this case, the divide algorithm below, programmed to perform this operation, the rounding mode is round-to-zero. The divide algorithm is typically programmed in machine code and as used in this example is:

| 1. | | y0 = TableLookUp(B) | |
|---|---|---|---|
| 2. | fnmsub | e = 1 − |B| (y0) | |
| 3. | fmul | q0 = |A| (y0) | |
| 4. | fmadd | y1 = (y0)(y0) + e | |
| 5. | fnmsub | e2 = |A| − q0|B| | |
| 6. | fmadd | t1 = (e) (e) + 0.5 | |
| 7. | fmul | t3 = (e2) (y1) | |
| 8. | fmadd | t2 = (t1) (t1) + 0.75 | |
| 9 | *fmadd | q1 = (t2)(t3) + q0 | Round-to-Zero |
| 10. | *fmadd1 | q1 + ulp = (t2)(t3) + q0 | Force ulp increment, Round-to-Zero |
| 11. | *fnmsub | q1R = |A| − (q1)|B| | Round-to-Zero |
| 12. | *fnmsub | q1ulpR = |A| − (q1 + ulp)|B| | Round-to-Zero |
| 13. | **fmul | q1 − ulp = (q1)(1 − 1/2ulp) | Possible Result |
| 14. | **fmul | q1 = (q1)(1.0) | Possible Result |
| 15. | **fmul | q1 + ulp = (q1 + ulp)(1.0) | Possible Result |

Viewing FIG. 3, values of A 304, B 306, and C 308 are read from a cache or memory (not shown) or other register into a floating point register 302. In cycle 0 (see FIG. 4), values for operands A 304 and B 306 are stored in register FA 316 and register FB 320, respectively. In cycle 1 (see FIG. 4) of the divide algorithm, operand B 306 is stored in register FA 316 and value in register FB 320 is read, passes through seed 324 and stored in register FC 318. The values stored in the register are accurate to eight bits. Any of the other values FA or FC may be used at seeds instead, depending upon the particular implementation. During cycles 2 and 3 (see FIG. 4), still during stage one of the pipeline (see FIG. 3), the values from registers FA 316 and FC 318 are input to a multiplier 322, and the value from register FB 320 is input to an aligner 326 and fast path compare logic 328. At stage two, cycles 2 and 3, the values of e and q0 represented in the equations 1 and 2 above are calculated with a floating point negate multiply subtract (fnmsub) function and a multiply (fmul) function. During cycles 7-14 at stage two, the values y1, e2, t1, t2, and t3 of equations 4, 5, 6, 7, and 8 above, respectively, are calculated using multiply add, negative multiply subtract, and multiply functions in a 3-to-2 full adder 330, a sum vector unit 332, and a carry vector unit 334, and adder 338 and make their way through the pipeline. What follows from this in stage three is that the intermediate divide result q1 has been calculated and stored in the intermediate divide result register 340, and the unit of least precision (ulp) has been determined in cycles 19-21.

In cycles 24 and 25 (see FIG. 4), events occur in the divide result selection and round control block 370 (see FIG. 3). The remainder of the intermediate divide result q1, and the remainder of the sum of the intermediate divide result plus the unit of least precision are calculated as follows: let q=A/B. The intermediate divide result is q1; and q1+ulp is the intermediate divide result plus the unit-of-least-precision. The inventive method herein defines the remainder of the intermediate divide result to be q1R=A−(B×q1); and the remainder of the intermediate divide result plus the unit-of-least-precision as q1ulpR=A−[B×(q1+ulp)]. The signs of these remainders (see block 342 in FIG. 3) are determined and input into the divide result selection and round control block 370. Comparison between the values A and B, i.e. between the values in register FA 316 and register FB 320 is determined in block 336 and also input into the the divide result selection and round control block 370. The actual rounding mode that was used by the algorithm is input as two round control bits from the floating point status and control register 360 (not shown).

The normalized result, i.e., the last instruction of the divide algorithm, from block 346 is also input into the divide result selection and round control block 370 which determines which guard and sticky bits will be presented to the round control block 350 and used to round the final quotient. The Write Enable (WRE) output from the divide result selection and round control block 370 presents the final intermediate divide result to the rounding procedure occurring in the rounding block 350 during stage five, and as explained with reference to FIG. 5. The inventor realized and manifested that in order to round an intermediate result correctly in compliance with the IEEDE floating point standards, IEEE-754 and -854, it is essential to know where the infinitely precise result is with respect to the intermediate divide result and the guard bit. The standard requires that the correct guard and sticky bits; and the inventor considered that the best way to determine these bits is to consider the value of the bits beyond the unit of least precision. Thus, the final intermediate divide results calculated at stage four in the pipeline at cycles 28-30 (heavily blocked in FIG. 4), and the correct guard bit, and the correct sticky bit are input to the rounding logic (see block 350 in FIG. 3) as output from the result selection and round control block 370 of FIG. 3. As presented in the table below and the flow chart of FIG. 5 and with the input of a particular rounding mode, the method described herein is used in accordance with the chart to select the final architecturally correct divide result to be one of the following: q1–ulp; or q1; or q1l+ulp and the correct guard and sticky bits to be written back to the floating point register file (302 in FIG. 3).

| Round Mode | sign R(i) $q_1R$ | sign R(i+1) $q_1ulpR$ | R(i+1) > R(i) FA > FB | Final Intermediate Result | G | S |
|---|---|---|---|---|---|---|
| Round-to-nearest | 0 | 0 | x | q1 + ulp | 0 | 1 |
| Can't Happen | 0 | 1 | 0 | q1 | 1 | 1 |
| Can't Happen | 0 | 1 | 1 | q1 | 0 | 1 |
| | 1 | 0 | 0 | | | |
| | 1 | 0 | 1 | | | |
| | 1 | 1 | x | q1 – ulp | 1 | 1 |
| Round-to-zero | 0 | 0 | x | q1 + ulp | 0 | 1 |
| and | 0 | 1 | x | q1 | 0 | 1 |
| Round-to +/– ∞ | 1 | 1 | x | q1 – ulp | 0 | 1 |

Figure 5:
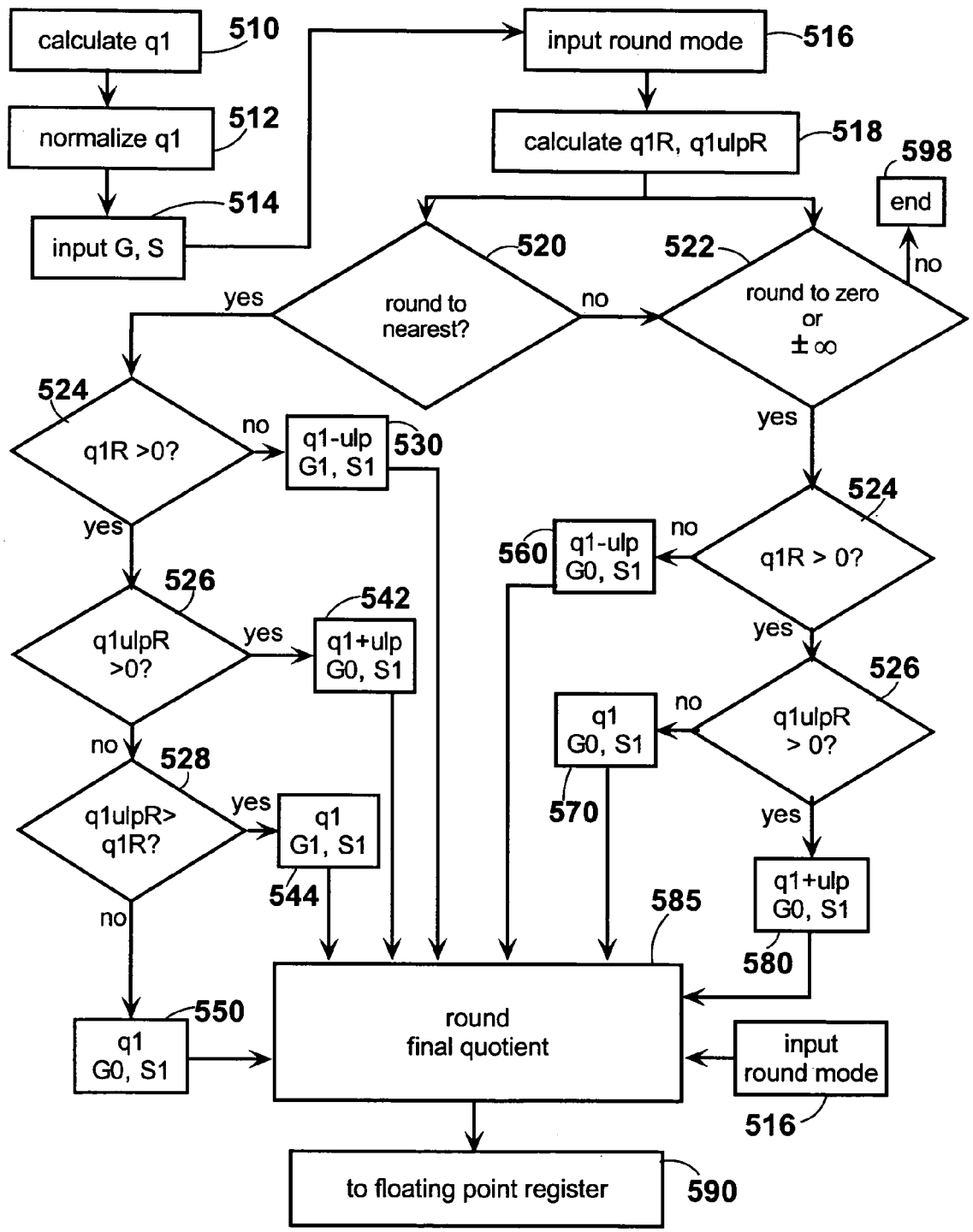
FIG. 5 is a simplified flow chart of the method to determine the most precise result of the unit of least precision in accordance with an embodiment of the invention. It is suggested that FIG. 5 be printed on the face of the patent.

A brief description of the process by which the correct guard and sticky bits and the correct intermediate divide result is generated for a particular rounding mode is presented in the flow chart of FIG. 5. These method steps occur in the divide result selection and round control block 370 of FIG. 3. n step 510, the intermediate divide result is calculated as described and in step 512, that intermediate divide result is normalized. From normalization, the intermediate divide result and the guard and sticky bits are input at step 514 into the divide result selection and round control block 370. Also input is the rounding mode, whether it be round-to-nearest; round-to-zero, or round-to-+/–infinity, as in step 516. At step 518, the remainders are calculated as explained above and the process separates into two paths: a first path for the round-to-nearest mode at step 520; and a second path 522 for round-to-zero and the round-to-+/–infinity rounding modes. In both paths, the sign of the remainder of the intermediate divide result is evaluated at step 524. If the sign of the remainder of the intermediate divide result is less than zero, then the most accurate intermediate divide result will be q1–ulp as in steps 530 and 560. Depending upon the mode, however, the guard bit and the sticky bit may either be the same, as in step 530 for the round-to-nearest mode; or they may differ with the guard bit being zero for the other modes, as in step 560. If the remainder of the intermediate divide result is greater than zero at step 524, then the remainder of the intermediate divide result plus the unit of least precision is evaluated, as in step 526. In all the rounding modes, if the remainder of the intermediate divide result plus the unit of least precision is greater than zero, then the most correct value to forward on for final rounding is q1+ulp and the guard and sticky bits differ with the guard bit being zero, as in blocks 542 and 580. This situation would indicate that the infinitely precise result would be closer to the intermediate result plus the unit of least precision.

If, however, the remainder of the intermediate divide result plus the unit of least precision is not greater than zero as in step 526, then the process determines at step 528 if the infinitely precise result is closer to the intermediate divide result q1 or is closer to the intermediate divide result plus the unit of least precision. If the remainder q1ulpR is greater than q1R, then the appropriate intermediate result is q1 with both the guard and sticky bits being one, as in block 544. If, however, the remainder q1ulpR is less than q1R, then the appropriate final intermediate result is still q1 but the guard bit is zero and the sticky bit is one, as in block 550. This is the correct intermediate result to forward for final rounding in other rounding modes too, as in block 570, when the remainder q1ulpR is less than zero at step 526.

Recall that hardware divide/square root algorithms of the prior art typically expand the width of the fused multiply-add logic to gain the extra precision needed to determine the guard and sticky bit. This is shown in FIG. 3, with the shaded areas of the FA register 316x, the Wallace tree multiplier 322x, the 3-to-2 full adder 330x, the sum vector unit 332x, the carry vector unit 334x, the add unit 338x. By concatenating a guess of the guard bit and using a remainder calculation, the correct value of the guard bit can be determined. Comparing the two remainder results and accessing the method described herein eliminates the need for the considerable extra gates and silicon real estate required to implement the extra bit of precision logic that widen the fused multiply-add hardware pipeline.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A computer program product stored in a non-transitory computer-readable medium to program a floating point processor to round floating point numbers, comprising:
   (a) instructions to calculate an intermediate quotient of two floating point numbers, A and B;
   (b) instructions to determine a unit of least precision (ULP) of the intermediate quotient;
   (c) instructions to calculate a first remainder using the two floating point numbers and the unit of least precision;

(d) instructions to calculate a second remainder using the two floating point numbers and the unit of least precision plus one;
(e) instructions to compare the signs and magnitudes of the first and second remainders;
(f) instructions using the comparison of the signs and magnitudes of the first and second remainders to:
when rounding mode is round-to-nearest:
  when a sign of the first remainder is "0" and a sign of the second remainder is "0", selecting the intermediate quotient plus a ULP as the final intermediate quotient, setting a guard bit to "0", and setting a sticky bit to "1";
  when the sign of the first remainder is "0" and the sign of the second remainder is "1" and the first remainder is larger than the second remainder, selecting the intermediate quotient as the final intermediate quotient, setting the guard bit to "1" and setting the sticky bit to "1";
  when the sign of the first remainder is "0" and the sign of the second remainder is "1" and the second remainder is larger than the first remainder, selecting the intermediate quotient as the final intermediate quotient, setting the guard bit to "0" and setting the sticky bit to "1"; and
  when the sign of the first remainder is "1" and the sign of the second remainder is "1" selecting the intermediate quotient minus a ULP as the final intermediate quotient, setting the guard bit to "1" and setting the sticky bit to "1";
when rounding mode is round-to-zero and when rounding mode is round to +/− infinity:
  when the sign of the first remainder is "0" and the sign of the second remainder is "0", selecting the intermediate quotient plus a ULP as the final intermediate result, setting the guard bit to "0" and setting the sticky bit to "1";
  when the sign of the first remainder is "0" and the sign of the second remainder is "1" selecting the intermediate quotient as the final intermediate quotient, setting the guard bit to "0", and setting the sticky bit to "1";
  when the sign of the first remainder is "1" and the sign of the second remainder is "1" selecting the intermediate quotient minus a ULP as the final intermediate quotient, setting the guard bit to "0" and setting the sticky bit to "1"; and
(g) instructions to apply the final intermediate quotient and the selected correct guard and sticky bits for correct rounding of the floating point number.

* * * * *